United States Patent

[11] 3,596,438

[72] Inventors John Beukenkamp, deceased
late of Milltown (by Mrs. John
Beukenkamp, administratrix);
Carl Kerby Stoddard, Westfield; Joseph L.
Waldman, Elizabeth, all of, N.J.
[21] Appl. No. 873,563
[22] Filed Nov. 3, 1969
[45] Patented Aug. 3, 1971
[73] Assignee National Lead Company
New York, N.Y.

[54] REMOVAL OF CARBONYL SULFIDE FROM
INDUSTRIAL GASES
12 Claims, 6 Drawing Figs.
[52] U.S. Cl. .................................................. 55/59,
55/74, 55/387
[51] Int. Cl. .............................................. B01d 53/00
[50] Field of Search ............................................ 23/2; 55/59,
74, 73

[56] References Cited
UNITED STATES PATENTS
3,000,988 9/1961 Karchmer et al. ............ 23/2.1 X
3,358,421 12/1967 Huxley et al. .................. 55/73 X Primary Examiner—Samih N. Zaharna
Assistant Examiner—R. W. Burks
Attorneys—Charles F. Kaegebehn, Robert L. Lehman, Harold
L. Gammons and Robert L. Holiday ABSTRACT: The disclosure is of a practical, economical process for removing carbonyl sulfide from the gases generated in a commercial process for producing titanium tetrachloride by chlorinating ilmenite ores, and is carried out by first freeing the gases of titanium tetrachloride, hydrochloric acid and chlorine and then sending the remaining gases, which comprise mainly, $CO$, $CO_2$ $N_2$ and $COS$, through a substantially dry static bed of activated carbon maintained at a relatively low temperature whereby the carbonyl sulfide is adsorbed on the activated carbon, the activated carbon then being regenerated for subsequent use by passing steam or an inert gas through the carbon bed at elevated temperatures followed by cooling; the invention being comprehensive also of a cyclic process wherein a series of four towers of activated carbon are used in a predetermined sequence for removing carbonyl sulfide from chlorinator gases continuously on a plant scale.

For purposes of identification and brevity the term "sour" gas will be used to identify chlorinator gases which have been freed of $TiCl_4$, $HCl$ and $Cl$ and comprise relatively large amounts of $CO_2$ plus $CO$, $N_2$ and small amounts of $COS$, while the term "sweet" gas will be used to identify a sour gas from which the $COS$ has been removed.

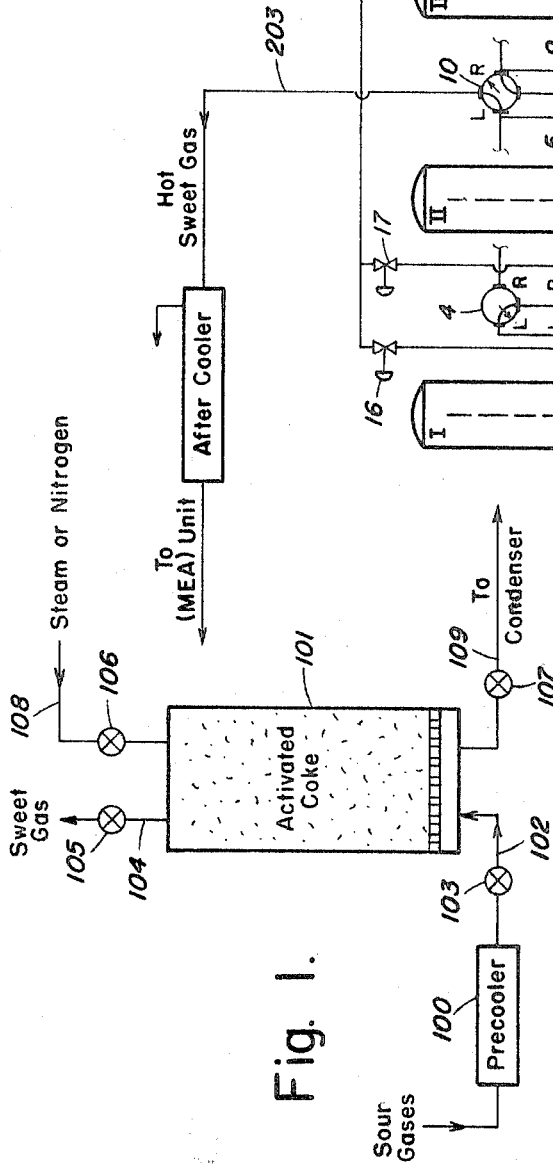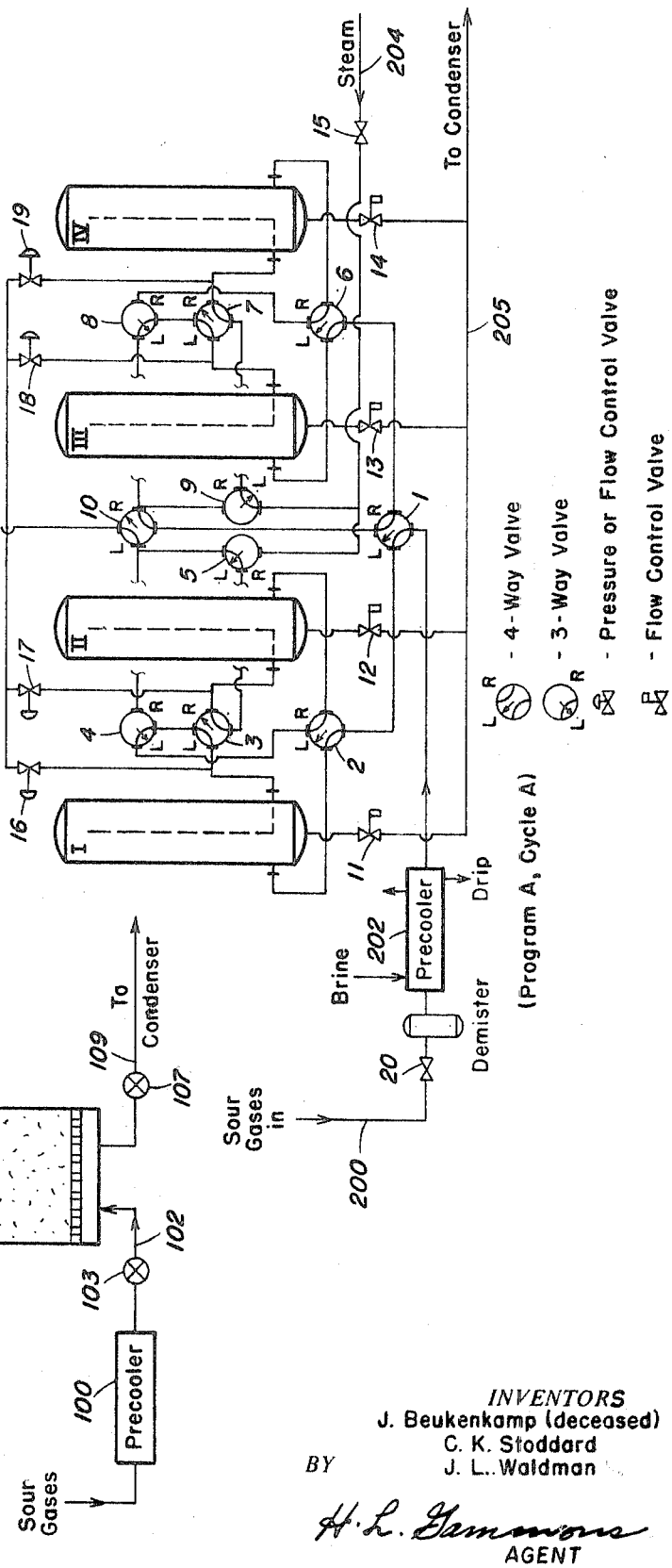

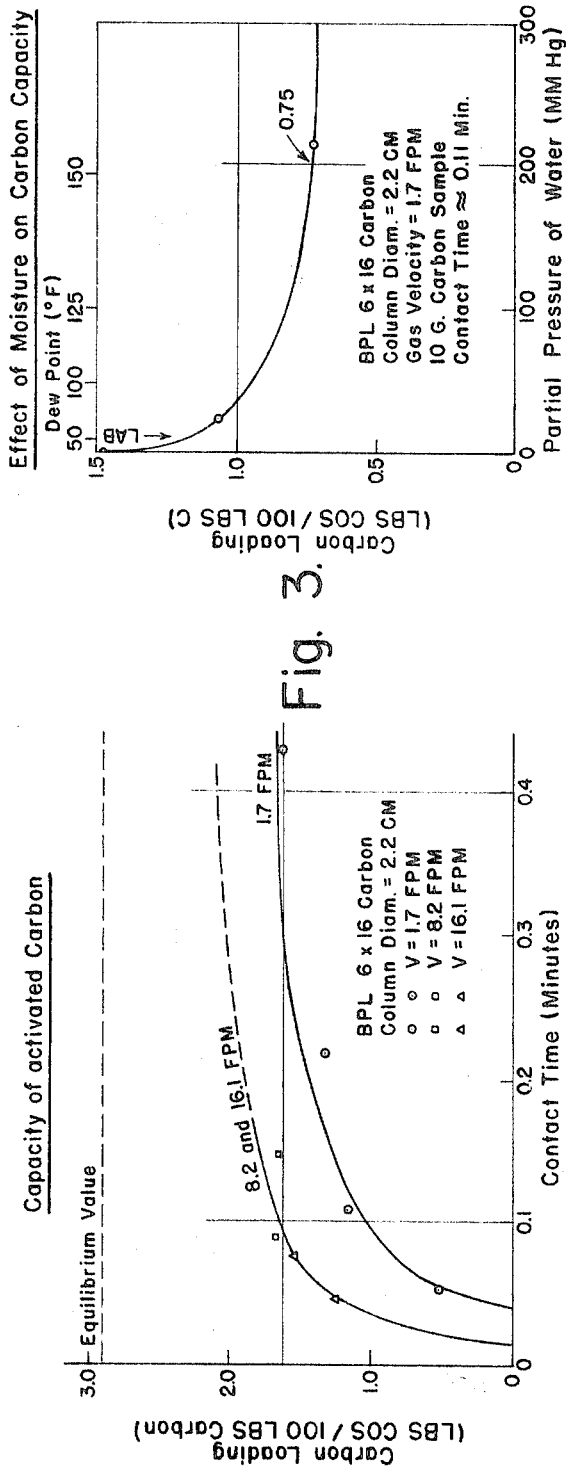
Fig. 3.
Fig. 5.
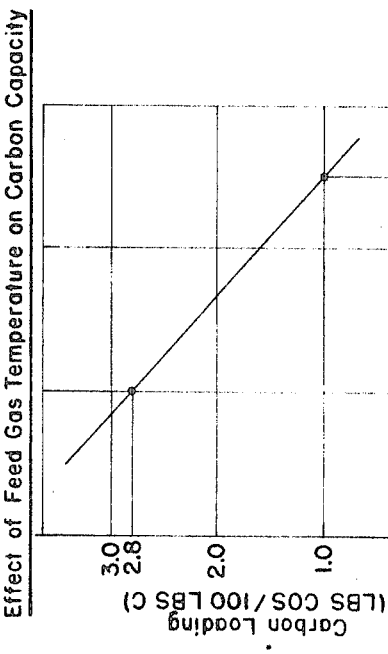
Fig. 2.
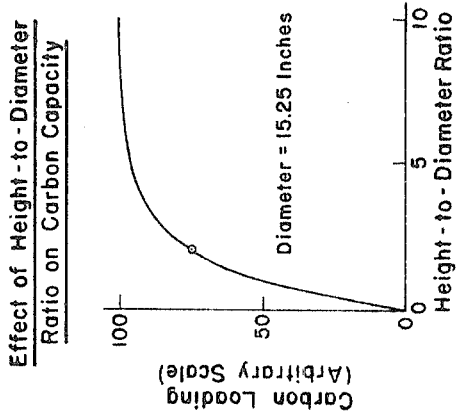
Fig. 4.
INVENTORS
J. Beukenkamp (deceased)
C. K. Stoddard
J. L. Waldman
BY
H. L. Gammons
AGENT

REMOVAL OF CARBONYL SULFIDE FROM INDUSTRIAL GASES

BACKGROUND OF THE INVENTION

The present invention has its inception in the constant search for ways for effecting greater economies in the commercial production of titanium tetrachloride, a product which is in ever increasing demand for use in the production of titanium metal, vapor phase $TiO_2$ pigment, organic titanium compounds and the like. In general titanium tetrachloride is produced by chlorinating ilmenite ores in the presence of a carbonaceous reducing agent. The off-gases from the chlorination will comprise gaseous $TiCl_4$, $Cl$, $HCl$, $CO$, $O_2$ and $N_2$ plus solid dust particles. These off-gases are sent to a dust collector and then to one or more condensers in which the gaseous $TiCl_4$ is condensed and recovered as a crude liquid $TiCl_4$ which is subsequently processed to form substantially pure $TiCl_4$. The residual gases comprise a mixture of $CO$, $CO_2$, $Cl$, $HCl$ and $N_2$ and in the interest of economy it is desirable to provide a method and means for separating these several gases for use in other industrial processes. For example in the production of vapor phase $TiO_2$ pigment by reaction of gaseous $TiCl_4$ with oxygen in the presence of $CO$, carbon dioxide is sometimes used as a coolant. In general separation of $HCl$ and $Cl$ from these residual gases has been accomplished effectively by sending the residual gases through a water scrub tower and then to a caustic scrub tower. For purposes of this application the gases recovered from the caustic scrub tower are referred to hereinafter and in the claims as sour gas and may comprise from 25 to 70 percent $CO$; from 29 to 60 percent $CO_2$; from 0.9 to 14 percent $N_2$ and from 1.0 to 0.1 percent $COS$. However during normal operation of a plant chlorinator the gases comprise more nearly from 39 to 42 percent $CO$, from 50 to 55 percent $CO_2$, from 5 to 6 percent $N_2$ and from 0.4 to 0.5 percent $COS$. Now one of the commonly known methods for separating $CO$ from $CO_2$ and $N_2$ is to send these gases through a monoethanolamine (MEA) absorber but surprisingly enough it was found that when sour gas was passed through the monoethanolamine absorber the $CO_2$ in the gas became contaminated with $H_2S$. It was then discovered that this was due to absorption of sulfur compounds and in particular the carbonyl sulfide derived from the carbonaceous reductant i.e. the petroleum coke used in the chlorinator. Petroleum coke has a sulfur content of from 1.1 to 1.6 percent or even higher and while sulfur in the form of sulfur dioxide, sulfur trioxide, hydrogen sulfide, carbon disulfide or thionyl chloride is removed by means of the $TiCl_4$ condensers and the scrub towers substantial amounts i.e. about 0.4 percent of carbonyl sulfide remains in the sour gas after removal of the chlorine products. While in theory it could be expected that in passing the mixture of $CO$, $CO_2$, $N_2$ and $COS$ through the (MEA) absorber the $COS$ would react with the monoethanolamine, according to the reaction:

$$HO-C_2H_4-NH_2+COS \rightarrow HO-C_2H_2-NHCOSH$$

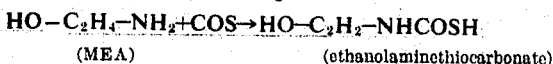

(MEA)          (ethanolaminethiocarbonate)

in practice it was found that carbonyl sulfide has a tendency to react with the monoethanolamine and form compounds that will not regenerate monoethanolamine and as a consequence the consumption of monoethanolamine becomes prohibitive. Also it was found that when the reaction products, ethanolaminethiocarbonate is reacted with water in the presence of heat the monoethanolamine will be regenerated to produce hydrogen sulfide and carbon dioxide. However the presence of the $H_2S$ in the $CO_2$ is, of course, undesirable since it gives rise to corrosion and related problems when the sulfide-containing $CO_2$ is used for other purposes in plant operations.

It became necessary therefore to remove the carbonyl sulfide from the sour gas before putting it through the monoethanolamine absorber and it has now been found that carbonyl sulfide can be stripped from a sour gas by passing the gas through relatively cold columns of activated carbon, this despite the presence of relatively large amounts of $CO_2$, $CO$ and $N_2$.

It is known that highly basic absorbing agents may be used for absorbing carbonyl sulfide. However the sour gas derived from chlorinator gases contain large amounts of $CO_2$ i.e. as high as 100 times the amount of carbonyl sulfide, and consequently when highly basic absorbing agents are used they are neutralized and do not remove the carbonyl sulfide. Also some fundamental research work has been done on absorption of pure COS on activated carbon as reported in I and E.C. 48, 7, 1123-1133, 7/56.

The present invention is characterized by the wholly unexpected discovery that a column of activated carbon can be operated successfully to remove COS from sour gas despite the presence of large amounts of $CO_2$ and even though the carbon is saturated with $CO_2$ gas.

SUMMARY OF THE INVENTION

The invention relates in general to the purification of industrial gases containing sulfur compounds and more especially to an improved method for removing carbonyl sulfide from sour gas produced in the chlorination of rutile or rutile concentrates wherein the sour gas, which comprises relatively large amounts of $CO_2$ in addition to $CO$, $N_2$, and $COS$, is sent through a column of substantially dry activated carbon in which the ratio of the height of the column to its diameter is at least 2.1:1, and at a bed temperature in the range from about 35° F. to no more than about 115° F.; and thereafter regenerating the column of activated carbon for subsequent absorption of COS by flushing it with superheated steam at from 400° F. to 550° F. and from 5—6 p.s.i.g. or with nitrogen at temperatures in the range of from 380°—510° F., followed by cooling the regenerated carbon preferably with sweet gas at a temperature as slow as 40° F.

By using the activated carbon column of this invention the carbonyl sulfide is adsorbed by the carbon and hence removed from the sour gas which, as sweet gas may then be sent through a monoethanolamine absorber for separating the $CO_2$ from the $CO$ and $N_2$ without adversely affecting the efficiency or function of the absorber; and the gases recovered from the monoethanolamine absorber may, in turn, be recycled to other production areas for use, for example, in the vapor phase production of $TiO_2$ without causing corrosion or air pollution problems.

DESCRIPTION OF THE DRAWINGS

FIG. 1 is a schematic view of an activated carbon of an adsorber including means for precooling a sour gas prior to being fed into the adsorber;

FIG. 2 is a graph showing the effect of variations in sour gas temperature on COS loading capacity of the carbon;

FIG. 3 is a graph showing the effect of variations in moisture content of a sour gas on the capacity of the carbon to adsorb COS;

FIG. 4 is a graph showing the effect of variations in the ratio of the height to diameter of the carbon column on the capacity of the of the carbon to adsorb COS;

FIG. 5 is a graph showing the effect of variations in the flow rate of a sour gas on the capacity of the carbon column to adsorb COS; and FIG. 6 is a schematic view of a plurality of activated carbon adsorption towers arranged to function according to one or more of several possible cyclic patterns for removing COS from sour gas being generated continuously on a plant scale.

DESCRIPTION OF PREFERRED EMBODIMENT

As mentioned at the outset the invention is applicable to the removal of carbonyl sulfide from industrial gases having a high percentage of $CO_2$ and may be done by the equipment shown schematically in FIG. 1 wherein the carbonyl sulfide adsorber comprises, preferably a cylindrical column or tower charged with activated carbon, the height of which is at least twice its diameter, and having a mesh size of −6+16 by Tyler screen analysis.

Using the equipment of FIG. 1 a series of experiments were made to explore the variables affecting the capacity of carbon to adsorb carbonyl sulfide in the presence of large amounts of $CO_2$. To begin with it was found that the particle size of the activated carbon, the pressure of the system and the concentration of COS in the sour gas bore a straight line relationship with the adsorption capacity of the carbon over the range of interest for commercial applications. Thus, as the particle size of the carbon was increased from about −30+140 to −4+10 its relative adsorption capacity dropped from about 1.35 to about 0.8. An increase in pressure within the carbon column from 14.7 p.s.i.g. to about 44.1 p.s.i.g. effected an increase of adsorption capacity from about 1.3 to about 2.3 blbs. COS/100 lbs. carbon. Further, an increase in COS concentration in the sour gas from about 0.34 to about 0.46 effected an increase in carbon loading capacity from about 1.6 to about 2.2 lbs. COS/100 lbs. carbon.

These findings and other factors dictated the size of equipment used, the arrangement of the activated carbon adsorbers, and the sequence of gas flow for effecting most economical plane operation. Thus and activated carbon was selected having a particle size of −6+16 and known commercially as type BPL sold by Pittsburgh Activated Carbon Co. Carbons of finer particle size were unsatisfactory because they tend to fluidize or produce high pressure drops while coarser carbons have lower adsorption capacity. Also while high operating pressures were found to give higher carbon adsorption capacity, they nevertheless increase the cost of equipment and operational hazards and hence for practical purposes the system of this invention was operated at about 15 p.s.i.g. The COS concentration was dictated by the source of the sour gas which in this instance was the residual gas recovered during chlorination of rutile ore to produce vaporous titanium tetrachloride on a plant scale and hence the COS concentration was consistently about 0.4 percent.

In addition to the foregoing controls it was found that the linear velocity of the sour gas, its moisture content, the temperature of the carbon column and the ratio of the height of the column to its diameter were all significant factors towards effecting a practical, economical process. Moreover as shown in FIGS. 3—5 of the drawings these controls do not bear a straight line relationship with the capacity of the carbon to adsorb COS i.e. carbon loading. Thus as shown in FIG. 5, at a linear velocity of about 1.7 ft./min. the highest carbon loading was about 1.6 lbs. COS/100 lbs. carbon after a period (contact time) of about 0.4 minutes whereas at a linear velocity of about 8.2 ft./min. the same loading was effected in about 0.1 min., and after 0.2 minutes rose to about 1.9 lbs. COS/100 lbs. carbon. However an increase in the linear velocity of the gases to 16.1 ft./min. effected substantially no change in the carbon loading. These studies indicate that the linear velocity of the gases should not be so high as to give contact times less than about 0.15 minutes for a given bed depth but should be at least about 8.5 ft./min. in order that the process not be diffusion controlled in the gas phase. In the plant operation described in detail below a linear velocity of about 50 ft./min. was used for a period of about 0.5 minutes.

The effect of moisture on carbon loading is shown in FIG. 3 and was found to be surprisingly critical. While the carbon loading of substantially dry gas at zero partial pressure of water in mm. mercury is about 1.5 lbs. COS/100 lbs. carbon, an increase in moisture content equivalent to an increase in partial pressure of 20 mm. mercury effected a drop in carbon loading to about 1.03 lbs. COS/100 carbon; and a drop in loading capacity to about 0.75 at a partial pressure of about 200 mm. mercury. It was patent therefore that for all practical purposes the gas must be substantially dry.

In like manner the loading capacity of the activated carbon was found to vary widely within a relatively narrow temperature range. As shown in FIG. 2 loadings were about 2.8 lbs. COS/100 lbs. carbon at about 40° F. and dropped off to about 1.0 with a 60° rise in temperature. These findings dictated that either the sour gas, the activated carbon column, or both, as the case may be, be refrigerated or cooled, to maintain a temperature within the carbon column in the range from about 35° F. to no more than about 115° F. during the adsorption cycle.

A final factor effecting the loading capacity of the carbon column was found to be the ratio of the height of the column to its diameter. As shown in FIG. 4 when the ratio of height H to diameter D is about 1.0 the loading capacity of the carbon is less than 50 percent of its maximum. At a H/D ratio of 2.0 the loading capacity jumps to about 75 percent of maximum and at about 5.0 levels off at about 96.7 percent of maximum. It was thus determined that in a plant scale operation the ratio of the height of the carbon column to its diameter should be at least about 2.0 and preferably not less than 4.5.

Thus using the operating conditions hereinabove described, the sulfur-containing gases i.e. sour gas originating from a chlorinator is fed through a demister and thereafter through a refrigerating unit 100, see FIG. 1. The cooled gas is then fed into the bottom of the adsorber column 101 via feed pipe 102 and by adjustment of valve 103 passes upwardly through the adsorber 101 under conditions of predetermined linear velocity and pressure. Due to the large proportion of $CO_2$ in the sour gas the carbon will be saturated with $CO_2$ but in spite of this the carbonyl sulfide contained in the sour gas will be adsorbed on the carbon and thus separated from the residual sweet gas i.e. $CO_2$, CO and $N_2$ which pass out of the top of the column via an exhaust pipe 104. In a normal operation the sour gas is sent through the carbon column continuously and is stopped preferably a short time before the breakthrough point is reached i.e. before a slight amount of carbonyl sulfide can be detected in gases being exhausted from the adsorber. When this happens valve 103 in the feed pipe 102 is closed thereby cutting off the flow of sour gas to the adsorber.

The adsorber column 101 is then regenerated, i.e. stripped of its adsorbed COS. This is done by closing the valve 105 in exhaust pipe 104 and opening valves 106 and 107 in pipes 108 and 109 respectively whereupon superheated steam or other hot gas is fed into the top of the adsorber column 101. In passing down through the carbon the steam releases the carbonyl sulfide adsorbed thereon and sweeps it out of the carbon column via exhaust pipe 109 together with the gaseous $CO_2$ adsorbed by the carbon—which mixture may be disposed of in any suitable manner. Regeneration of the carbon by superheated steam or other suitable hot gas is continued until no carbonyl sulfide is present in the gases exhausted from the column. While regenerating gas temperatures as slow as 225° F. have been used higher temperatures i.e. temperatures of from 400°—510° F. are preferred since these insure maximum removal of COS and hence optimum loading capacity of the carbon in the subsequent adsorption cycle. Although superheated steam is a preferred regenerating gas, heated CO, $CO_2$ or sweet gas may be used also. The regenerated column is then cooled, preferably by passing sweet gas cooled to a temperature from 33° F. to 75° F. through the regenerated column.

The following examples will serve to further illustrate this embodiment of the invention.

EXAMPLE I

The adsorber tower had a diameter of 6 inches, was 17.7 feet high and was filled to a height of 15.7 feet with 100 lbs. of substantially dry activated carbon having a particle size −6+ 16 by Tyler screen analysis. The ratio of the height of the carbon column to its diameter (H/D) was about 31.1. During the adsorption cycle a sour gas comprising about 42 percent CO, about 52 percent $CO_2$, about 5.5 percent $N_2$ plus about 0.41 percent COS was passed upwardly through the carbon column having an average temperature of 91° F. at a flow rate of about 13 standard cu. ft./min. corresponding to a Reynolds No. of 69. The pressure in the system was about 11.2 p.s.i.g. The adsorption run was continued for 3.3 hours at which time breakthrough occurred. The loading capacity of the carbon in lbs. of COS per 100 lbs. of carbon was 1.66. The sour gas was then shut off and the carbon column regenerated by passing superheated steam at 420° F. down through the column at a flow rate of 0.99 lbs./hr. to purge the carbon of COS. Regeneration was continued for 14.5 hours during which time the gaseous COS plus $CO_2$ were discharged from the bottom of the column and disposed of. When no further COS was detected in the discharge from the column the superheated steam was shut off and the carbon column thoroughly dried and cooled by sending dry nitrogen gas at 55° F. upwardly through the column at a flow rate of 59 lbs./hr. for 4.5 hours. The carbon column was thus regenerated for treatment of additional sour gas.

EXAMPLES II—IV

Additional runs were made using the same carbon column as that described in example I. In these runs, which are identified as example II through IV variations were made in the average temperature of the carbon column ranging from 81° F. to 98° F., and the pressure within the carbon column was varied from 10.2 p.s.i.g. to 12.8 p.s.i.g. Other variables are shown in table I below in which it will be seen that the loading capacity of the carbon column varied from 1.43 to as high at 1.94 lbs. COS per 100 lbs. carbon. Each of these carbon columns were regenerated following breakthrough by passing superheated steam down through the column for an interval of time required to remove substantially all traces of COS from the carbon column after which the column was dried and cooled by passing cool nitrogen gas through it.

EXAMPLE V

This example further illustrates the invention using in this instance an adsorber having a diameter of 15.25 inches packed to height of 32 inches with 107 lbs. of activated carbon such as used in the preceding examples the ratio of the height of the diameter of the carbon column being 2.1:1. During the adsorption cycle a sour gas having the composition of that used in the preceding examples was passed upwardly through the carbon column which was maintained at an average temperature of 112° F., the flow rate of said gas being about 13 standard cu. ft./min. corresponding to a Reynolds No. of 69. The pressure in the system was about 11.8 p.s.i.g. The adsorption run was continued for 1.7 hours at which time breakthrough occurred. The loading capacity of the carbon in lbs. of COS/100 lbs. carbon was 0.77. The sour gas was then shut off and the carbon column regenerated by passing superheated steam at 420° F. at about 5 p.s.i.g. and at a flow rate of 1.85 lbs./hr. down through the column to purge the carbon of COS. Regeneration was continued for 4 hours during which time the gaseous COS plus $CO_2$ were discharged from the bottom of the column and disposed of. After 4 hours no further COS was detected in the discharge from the column, whereupon the superheated steam was shut off and the carbon column thoroughly dried and cooled by sending dry nitrogen gas at 75° F. upwardly through the column at a flow rate of 64 lbs./hr. for 16.75 hours. The carbon column was thus regenerated for treatment of additional sour gas.

EXAMPLES VI—VII

Additional runs identified as examples VI and VII were made using the same column as used in example V but modifying the operating conditions somewhat. In example VI sour gas was fed into the carbon column maintained at a temperature of about 100° F. and at a pressure of about 12.6 p.s.i.g. The sour gas was fed through the column at the rate of 13 standard cu. ft./min. Breakthrough occurred after 2.2 hours. The loading capacity of the carbon was 1.09 or 76 percent of theoretical. The carbon column was then regenerated by passing superheated steam at 430° F. at about 5—10 p.s.i.g. and at a flow rate of 1.71 lbs./hr. down through the column. Regeneration was continued for 4 hours after which the column was thoroughly dried and cooled by passing dry nitrogen at 75° F. upwardly therethrough at a flow rate of 64 lbs./hr. for 16.5 hours.

Example VII is a modification of example V and VI to the extent that the average temperature of the carbon column was 98° F., the COS concentration 0.41 and pressure in the system during adsorption 13.4 p.s.i.g. The actual loading capacity of the coke was 1.15. Regeneration was carried out with superheated steam at 450° F. at about 5—10 p.s.i.g. and a flow rate of 1.74 lbs./hr. for 4 hours after which the column was cooled and dried by flushing with cold dry nitrogen gas at 72° F. for 17.75 hours.

TABLE I

Adsorption of Carbonyl Sulfide by Carbon Column and Regeneration of Column.

| Adsorption | Ex.I | Ex.II | Ex.III |
|---|---|---|---|
| H/D | 31:1 | 31:1 | 31:1 |
| Aver. Temp. Column (°F.) | 91 | 88 | 97 |
| Gas flow rate std. cu.ft./min. | 13 | 13 | 13 |
| Pressure (p.s.i.g.) | 11.2 | 11.2 | 11.8 |
| Cos conc. (%) in sour gas | 0.41 | 0.42 | 0.42 |
| Break-thru-hrs. | 3.3 | 3.3 | 2.8 |
| Load Cap. (lbs. cos/100 lbs.C.) | 1.66 | 1.43 | 1.71 |
| Regeneration Steam (°F.) | 420.0 | 430.0 | 510.0 |
| Flow rate (lbs./hr.) | 0.99 | 0.76 | 1.22 |
| Interval (hrs.) | 14.5 | 7.5 | 15.25 |
| Drying Gas | $N_2$ | $N_2$ | $N_2$ |
| Temp.(°F.) | 55.0 | 50.0 | 60.0 |
| Flow rate | 59.0 | 59.0 | 64 lbs./hr. |
| Interval (hrs.) | 4.5 | 5.0 | 4.0 |

TABLE II

| Adsorption | Ex.IV | Ex.V | Ex.VI | Ex.VII |
|---|---|---|---|---|
| H/D | 31:1 | 2.1:1 | 2.1:1 | 2.1:1 |
| Aver. Temp. Column (°F.) | 81 | 112 | 100 | 98 |
| Gas flow rate std. cu.ft./min. | 13 | 13 | 13 | 13 |
| Pressure (p.s.i.g.) | 10.2 | 11.8 | 12.6 | 13.4 |
| Cos conc. (%) in sour gas | 0.46 | 0.41 | 0.45 | 0.41 |
| Break-thru (hrs.) | 3.5 | 1.7 | 2.2 | 2.2 |
| Load Cap. (lbs. Cos100 lbs. C.) | 1.94 | 0.77 | 1.09 | 1.15 |
| Regeneration Steam (°F.) | 430.0 | 460.0 | 430.0 | 450 |
| Flow rate (lbs./hr.) | 0.81 | 1.85 | 1.71 | 1.74 |
| Interval (hrs.) | 8.0 | 4.0 | 4.0 | 4.0 |
| Drying Gas | $N_2$ | $N_2$ | $N_2$ | $N_2$ |
| Temp. (°F.) | 58.0 | 75.0 | 75.0 | 72.0 |
| Flow rate (lbs./hr. | 64.0 | 64.0 | 64.0 | 64.0 |
| Interval (hrs.) | 4.0 | 16.75 | 16.50 | 17.75 |

The foregoing description and examples are concerned with the operation of a single carbon column, such as shown schematically in FIG. 1 which after serving as a COS adsorber is then regenerated and cooled for further use. However for full plant scale operation it has been found expedient to carry out the several distinct processing steps described above i.e. adsorption, regeneration and cooling using a plurality of activated carbon columns. FIG. 6 shows schematically a plant oriented design comprising four towers of activated carbon connected by suitable piping including appropriate valves whereby COS containing gases may be fed to the four towers in sequence in accordance with a predetermined program.

Since each tower at one time or another will be used as a COS adsorber the towers are substantially identical. In the embodiment of the invention illustrated in FIG. 6 each tower, identified as I, II, III and IV respectively, was 33 feet high and 66 inches in diameter and filled to a predetermined depth of 25 feet with an activated carbon i.e. type BPL −6+16 provided by the Pittsburgh Activated Carbon Co., such that the ratio of the height of the column of carbon to its diameter was about 4.55. The sour gas was fed through pipe line 200 having shut off valve 20 to a demistor for removing moisture and from thence to a precooler 202 for cooling the sour gas, the precooler being cooled, in turn, by circulating brine which entered the precooler 202 at about 35° F. The sour gas was thus cooled from about 110° F. to about 35°—40° F. before entering the adsorption towers.

The precooled sour gas which comprises about 55 percent $CO_2$, 39.2 percent CO, 5.2 percent $N_2$ and about 0.5 percent COS, was fed into each tower, successively, when serving as an adsorber, at a flow rate of about 1,300.0 standard cu. ft./min. at an initial pressure of about 15.0 p.s.i.g. the temperature in each tower during the adsorption cycle being about 40°—50° F. Adsorption was continued for about 6.0 hours after which the sour gas feed was cut off by closing valve 20. Each tower, following adsorption, was then regenerated by superheated steam entering at about 430° F. at about 3—8 p.s.i.g. and at a flow rate of about 4,300.0 lbs./hour for a period of about 5.5 hours.

Following regeneration of its carbon column each regenerated column was cooled by passing cool sweet gas therethrough at about 50° F. and at a rate of about 1,300 standard cu. ft./min. for 6 hours. To this end the cool sweet gas issuing from an adsorption tower was piped into the hot regenerated column to cool the latter; and the heated sweet gas issuing therefrom was carried off by pipe 203 to an aftercooler where it was cooled and then sent to the MEA unit as and for the purpose hereinabove described. In this connection it is important to note that by using the cool sweet gas recovered from an adsorber tower to cool a regenerated column of carbon, in lieu of a cold inert gas i.e. nitrogen, the carbon in the regenerated column is saturated with $CO_2$ during the cooling cycle thereby precluding a rapid adsorption of $CO_2$ during the next COS adsorption cycle with attendant sudden increase in temperature and interruption in the $CO_2$ supply downstream of the adsorber. As mentioned above the heated sweet gas issuing from the cooled regenerated column is sent to a monoethanolamine absorber where the $CO_2$ was separated from the CO and $N_2$ gases. The superheated steam used to regenerate each column of activated carbon was piped to each column via a supply pipe 204 having a shutoff valve 15; and the COS and $CO_2$ gases exhausted from each column during regeneration were carried off via common exhaust pipe 205 to a suitable condenser (not shown) where the steam was condensed and separated from the COS and $CO_2$.

While the four towers and their connecting piping and valves offer numerous programs, one program in particular has been discovered, hereinafter identified as Program A, which utilizes each tower successively as an adsorber followed by steaming (regeneration), cooling and as a standby with minimum valve porting and hence offers the most economical and efficient use of material and equipment for adsorption of COS on a plant scale.

PROGRAM A

| Cycle | Tower I | Tower II | Tower III | Tower IV |
|---|---|---|---|---|
| A | Adsorbing | Cooling | Idling | Steaming |
| B | Steaming | Idling | Adsorbing | Cooling |
| C | Cooling | Adsorbing | Steaming | Idling |
| D | Idling | Steaming | Cooling | Adsorbing |

The piping and valves used to connect the four towers are shown in FIG. 6 wherein it will be seen that valves 1—10 are either 3-way or 4-way valves and valves 11—20 are straight through valves. The selected valve settings for carrying out the aforesaid program are shown in Table III:

TABLE III

VALVE SETTINGS FOR PROGRAM A

| CYCLE | VALVE NO./POSITION | | | | | |
|---|---|---|---|---|---|---|
| A | 1/L | 2/L | 3/R | 4/L | 5/L | 6/L |
|   | 7/R | 8/L | 9/L | 10/R | 11/C | 12/C |
|   | 13/C | 14/O | 15/O | 16/C | 17/C | 18/O |
|   | 19/C | 20/O | | | | |
| B | 1/R | 2/R | 3/L | 4/R | 5/R | 6/L |
|   | 7/R | 8/R | 9/R | 10/L | 11/O | 12/C |
|   | 13/C | 14/C | 15/O | 16/C | 17/O | 18/C |
|   | 19/C | 20/O | | | | |
| C | 1/L | 2/R | 3/L | 4/L | 5/L | 6/R |
|   | 7/L | 8/L | 9/L | 10/R | 11/C | 12/C |
|   | 13/O | 14/C | 15/O | 16/C | 17/C | 18/C |
|   | 19/O | 20/O | | | | |
| D | 1/R | 2/L | 3/R | 4/R | 5/R | 6/R |
|   | 7/L | 8/R | 9/R | 10/L | 11/C | 12/O |
|   | 13/C | 14/C | 15/O | 16/O | 17/C | 18/C |
|   | 19/C | 20/O | | | | | wherein L = Left; R = Right; O = Open; C = Closed

As mentioned above the invention is comprehensive of a large number of programs and while the foregoing is distinct in requiring minimum valve porting and an opportunity to inspect or repair a tower during the time it is on standby other programs may be used as for example Program B wherein all towers are in operation continuously.

PROGRAM B

| Cycle | Tower I | Tower II | Tower III | Tower IV |
|---|---|---|---|---|
| A | Adsorbing | Adsorbing | Cooling | Steaming |
| B | Steaming | Adsorbing | Adsorbing | Cooling |
| C | Cooling | Steaming | Adsorbing | Adsorbing |
| D | Adsorbing | Cooling | Steaming | Adsorbing |

The valve settings for PROGRAM B are as follows:

TABLE IV

VALVE SETTINGS FOR PROGRAM B

| CYCLE | VALVE NO./POSITIONS | | | | | |
|---|---|---|---|---|---|---|
| A | 1/L | 2/L | 3/R | 4/L | 5/L | 6/L |
|   | 7/R | 8/L | 9/L | 10/L | 11/C | 12/C |
|   | 13/C | 14/O | 15/O | 16/C | 17/C | 18/C |
|   | 19/C | 20/O | | | | |
| B | 1/L | 2/R | 3/L | 4/R | 5/R | 6/L |
|   | 7/R | 8/R | 9/R | 10/L | 11/O | 12/C |
|   | 13/C | 14/C | 15/O | 16/C | 17/C | 18/C |
|   | 19/C | 20/O | | | | |
| C | 1/R | 2/L | 3/R | 4/R | 5/R | 6/L |
|   | 7/R | 8/R | 9/R | 10/R | 11/C | 12/O |
|   | 13/C | 14/C | 15/O | 16/C | 17/C | 18/C |
|   | 19/C | 20/O | | | | |
| D | 1/R | 2/L | 3/R | 4/L | 5/L | 6/R |
|   | 7/L | 8/L | 9/L | 10/R | 11/C | 12/C |
|   | 13/O | 14/C | 15/O | 16/C | 17/C | 18/C |
|   | 19/C | 20/O | | | | |

From the foregoing description and examples it will be seen that the invention provides, in general, a process for removing organic sulfide compounds from industrial gases and more especially for the removal of COS from chlorinator gases which include a relatively large proportion of $CO_2$ gas, economically and in a manner adapted to plant scale operations whereby the problems attending corrosion, repair and replacement of equipment as well as malfunctioning, downtime and expense are largely eliminated.

While this invention has been described and illustrated by the examples shown, it is not intended to be strictly limited thereto, and other variations and modifications may be employed within the scope of the following claims.

We claim:
1. Process for removing carbonyl sulfide from industrial gases containing large proportions of $CO_2$, CO and $N_2$ in addition to said carbonyl sulfide comprising the steps of: cooling said gases, feeding the cooled gases through a column of substantially activated carbon wherein the ratio of the height of said column to its diameter is at least 2:1 while maintaining the temperature of said tower of activated carbon in the range from 350° F. to no more than about 115° F. to absorb the carbonyl sulfide on said activated carbon and recover a sweet gas comprising $CO_2$, CO and $N_2$, regenerating said column of activated carbon by passing a substantially dry fluid selected from the group consisting of superheated steam and nitrogen at elevated temperature therethrough to remove the adsorbed carbonyl sulfide and $CO_2$ therefrom and then cooling the regenerated column of activated carbon.

2. Process for removing carbonyl sulfide from industrial gases containing the same according to claim 1 wherein the regenerated column of activated carbon is cooled by passing cool sweet gas therethrough.

3. Process for removing carbonyl sulfide from industrial gases containing the same according to claim 1 wherein said industrial gas is cooled to a temperature at least as low as about 50° F. prior to being fed into said column of activated carbon.

4. Process for removing carbonyl sulfide from industrial gases containing the same according to claim 1 wherein the cooled industrial gases are passed through said column of activated carbon for from about 1.5 to 8.0 hours.

5. Process for removing carbonyl sulfide from industrial gases containing the same according to claim 1 wherein the activated carbon is regenerated by passing superheated steam through said column of activated carbon for from 4 to 16 hours.

6. Process for removing carbonyl sulfide from industrial gases containing the same according to claim 5 wherein the temperature of said superheated steam is in the range of 400° to 550° F.

7. Process for removing carbonyl sulfide from industrial gases containing the same according to claim 1 wherein the said industrial gases comprise from 39 to 42 percent carbon monoxide, from 50 to 55 percent carbon dioxide, from 5 to 6 percent nitrogen and from 0.4 to 0.5 percent carbonyl sulfide.

8. Process for removing carbonyl sulfide from industrial gases containing the same according to claim 1 wherein the ratio of the height of the column of activated carbon to its diameter is in the range of from 2:1 to 32:1.

9. Continuous process for removing carbonyl sulfide from industrial gases containing a large proportion of $CO_2$, CO and $N_2$ in addition to said carbonyl sulfide comprising the steps of: cooling said gases to a temperature as low as 30° F., feeding the cooled gases successively through each of a plurality of columns of activated carbon interconnected by pipe lines and valves, wherein the ratio of the height of each column of activated carbon to its diameter is at least 2:1, and at a flow rate at not less than 8.2 ft./sec., said cooled gases being fed to each one of said columns of activated carbon successively in accordance with a 4-phase cyclic program and each column of activated carbon serving, in turn, as a carbonyl sulfide adsorber, maintaining the temperature in each column of activated carbon, in the range of from 35° to 115° F. to adsorb the carbonyl sulfide on said activated carbon and recover a cool sweet gas comprising $CO_2$, CO and $N_2$, and regenerating and cooling each column of activated carbon following the adsorption cycle.

10. Continuous process for recovering carbonyl sulfide from industrial gases according to claim 9 wherein each column is regenerated, in turn, by passing superheated steam therethrough at a temperature from 400° to 550° F. and each regenerated column is cooled, in turn, by passing the cool sweet gas recovered from an adsorbtion tower through said regenerated column.

11. Continuous process for removing carbonyl sulfide from industrial gases according to claim 10 characterized by the following program;

PROGRAM A

| Cycle | Tower I | Tower II | Tower III | Tower IV |
|---|---|---|---|---|
| A | Adsorbing | Cooling | Idling | Steaming |
| B | Steaming | Idling | Adsorbing | Cooling |
| C | Cooling | Adsorbing | Steaming | Idling |
| D | Idling | Steaming | Cooling | Adsorbing | wherein said program is being maintained by manipulation of the valves in the pipe lines interconnecting said columns of activated carbon in accordance with the following valve settings:

| CYCLE | VALVE NO./POSITIONS | | | | | |
|---|---|---|---|---|---|---|
| A | 1/L | 2/L | 3/R | 4/L | 5/L | 6/L |
|   | 7/R | 8/L | 9/L | 10/R | 11/C | 12/C |
|   | 13/C | 14/O | 15/O | 16/C | 17/C | 18/O |
|   | 19/C | 20/O | | | | |
| B | 1/R | 2/R | 3/L | 4/R | 5/R | 6/L |
|   | 7/R | 8/R | 9/R | 10/L | 11/O | 12/C |
|   | 13/C | 14/C | 15/O | 16/C | 17/O | 18/C |
|   | 19/C | 20/O | | | | |
| C | 1/L | 2/R | 3/L | 4/L | 5/L | 6/R |
|   | 7/L | 8/L | 9/L | 10/R | 11/C | 12/C |
|   | 13/O | 13/O | 14/C | 15/O | 16/C | 17/C | 18/C |
|   | 19/O | 20/O | | | | |
| D | 1/R | 2/L | 3/R | 4/R | 5/R | 6/R |
|   | 7/L | 8/R | 9/R | 10/L | 11/C | 12/O |
|   | 13/C | 14/C | 15/O | 16/O | 17/C | 18/C |
|   | 19/C | 20/O | | | | | where L and R denote left and right settings of the valves O and C denote open and closed positions of the valves.

12. Continuous process for removing carbonyl sulfide from industrial waste gases according to claim 10 characterized by the following program;

PROGRAM B

| Cycle | Tower I | Tower II | Tower III | Tower IV |
|---|---|---|---|---|
| A | Adsorbing | Adsorbing | Cooling | Steaming |
| B | Steaming | Adsorbing | Adsorbing | Cooling |
| C | Cooling | Steaming | Adsorbing | Adsorbing |
| D | Adsorbing | Cooling | Steaming | Adsorbing | said program being maintained by manipulation of the valves in the pipe lines interconnecting said columns of activated carbon in accordance with the following valve settings:

| CYCLE | VALVE NO./POSITION | | | | | |
|---|---|---|---|---|---|---|
| A | 1/L | 2/L | 3/R | 4/L | 5/L | 6/L |
|   | 7/R | 8/L | 9/L | 10/L | 11/C | 12/C |
|   | 13/C | 14/O | 15/O | 16/C | 17/C | 18/C |
|   | 19/C | 20/O | | | | |
| B | 1/L | 2/R | 3/L | 4/R | 5/R | 6/L |
|   | 7/R | 8/R | 9/R | 10/L | 11/O | 12/C |
|   | 13/C | 14/C | 15/O | 16/C | 17/C | 18/C |
|   | 19/C | 20/O | | | | |
| C | 1/R | 2/L | 3/R | 4/R | 5/R | 6/L |
|   | 7/R | 8/R | 9/R | 10/R | 11/C | 12/O |
|   | 13/C | 14/C | 15/O | 16/C | 17/C | 18/C |
|   | 19/C | 20/O | | | | |
| D | 1/R | 2/L | 3/R | 4/L | 5/L | 6/R |
|   | 7/L | 8/L | 9/L | 10/R | 11/C | 12/C |
|   | 13/O | 14/O | 15/O | 16/C | 17/C | 18/C |
|   | 19/C | 20/O | | | | |